(12) United States Patent
Jossem

(10) Patent No.: US 9,497,987 B2
(45) Date of Patent: Nov. 22, 2016

(54) DEVICES AND METHODS FOR INSTANTLY FREEZING FOOD PRODUCTS

(71) Applicant: Chef'n Corporation, Seattle, WA (US)

(72) Inventor: Adam A. Jossem, Seattle, WA (US)

(*) Notice: Subject to any disclaimer, the term of this patent is extended or adjusted under 35 U.S.C. 154(b) by 419 days.

(21) Appl. No.: 13/850,821

(22) Filed: Mar. 26, 2013

(65) Prior Publication Data
US 2013/0247595 A1  Sep. 26, 2013

Related U.S. Application Data

(60) Provisional application No. 61/615,769, filed on Mar. 26, 2012.

(51) Int. Cl.
| | |
|---|---|
| *A23L 3/36* | (2006.01) |
| *A23G 9/08* | (2006.01) |
| *F25D 3/08* | (2006.01) |

(52) U.S. Cl.
CPC .............. *A23L 3/36* (2013.01); *A23G 9/083* (2013.01); *A23L 3/364* (2013.01); *F25D 3/08* (2013.01); *F25D 2303/0831* (2013.01); *F25D 2303/0845* (2013.01); *F25D 2331/812* (2013.01)

(58) Field of Classification Search
CPC ........... A23L 3/36; A23L 3/364; F25D 3/08; F25D 2331/812; F25D 2303/0831; F25D 2303/0845; A23G 9/083
See application file for complete search history.

(56) References Cited

U.S. PATENT DOCUMENTS

| | | | | |
|---|---|---|---|---|
| 3,148,676 A | * | 9/1964 | Truog ................ | A47J 41/0044 126/246 |
| 3,715,895 A | * | 2/1973 | Devlin ................ | A23G 9/045 62/438 |
| 3,840,153 A | * | 10/1974 | Devlin ................ | A45F 3/20 215/229 |
| 4,086,907 A | * | 5/1978 | Rothschild ........ | A47J 41/0044 126/246 |
| 5,125,391 A | * | 6/1992 | Srivastava ........ | A47G 19/027 126/246 |
| 5,603,858 A | * | 2/1997 | Wyatt ................ | A47J 39/006 126/246 |
| 6,005,233 A | * | 12/1999 | Wyatt ................ | A47J 36/2494 126/246 |
| 6,119,470 A | | 9/2000 | Chiang | |
| 6,188,053 B1 | * | 2/2001 | Wyatt ................ | A47J 36/2494 126/400 |
| 2005/0218146 A1 | * | 10/2005 | Thissen ............. | A47J 41/0044 220/592.28 |
| 2007/0186580 A1 | * | 8/2007 | Kaplan ............. | A23L 3/36 62/457.5 |

FOREIGN PATENT DOCUMENTS

GB  2 178 150 A  2/1987

* cited by examiner

*Primary Examiner* — Emmanuel Duke
(74) *Attorney, Agent, or Firm* — Seed IP Law Group LLP

(57) ABSTRACT

A device for quickly freezing food product incorporates a pan and a base. The pan is adapted to receive the food product to be frozen, and has a bottom portion and a wall portion surrounding the bottom portion. The bottom portion of the pan has an upper surface and an opposing lower surface. The base is positioned under the bottom portion and the wall portion of the pan. The wall portion of the base is coupled to the wall portion of the pan such that the pan and the base form a unitary body. A cavity exists between the bottom portion of the base and the lower surface of the bottom portion of the pan. A plurality of fins project outwardly from lower surface of the bottom portion of the pan into the cavity.

19 Claims, 9 Drawing Sheets

DEVICES AND METHODS FOR INSTANTLY FREEZING FOOD PRODUCTS

BACKGROUND OF THE INVENTION

1. Field of the Invention

The present disclosure is generally related to kitchen tools, and more particularly, to tools for quickly freezing liquid food products, such as ice cream.

2. Description of the Related Art

Freezing liquids into food products has long been important in consumption and preparation of food items. Generally, a base mix may be prepared initially and placed in a container. Thereafter, the container may be placed in a freezer for a lengthy duration until the base mix freezes. In many instances, commercially available freezers, household and industrial, may be limited in their capacities in terms of how low the temperatures can be set. For instance, household freezers may not be set to a temperature lower than 10° Fahrenheit. The limitations posed by the capacities of conventional freezers may inconveniently increase the time to prepare frozen food products.

In addition, conventional products that may freeze liquids into frozen food products, such as ice cream makers, for example, are complex and may require multiple steps before the end product is obtained. Further, conventional products may also require special cleaning procedures and may also be expensive to repair.

BRIEF SUMMARY OF THE INVENTION

Embodiments described herein provide devices and methods for quickly freezing food products, such as ice cream, gelato, or sorbet. According to one embodiment, a device for quickly freezing a food product may be summarized as including: a pan adapted to receive the food product to be frozen, the pan having a bottom portion and a wall portion surrounding the bottom portion, the bottom portion having an upper surface and an opposing lower surface; a base positioned under the pan, the base having a bottom portion and a wall portion, the wall portion of the base being coupled to the wall portion of the pan, a cavity existing between the bottom portion of the base and the lower surface of the bottom portion of the pan; and a heat sink positioned within the cavity to assist in freezing the food product.

According to another embodiment, a device for quickly freezing a food product may be summarized as including: a pan adapted to receive the food product to be frozen, the pan including a bottom portion, the bottom portion having an upper surface and an opposing lower surface, a wall portion surrounding the bottom portion, and an engagement arrangement; a base positioned under the pan, the base including a bottom portion, a wall portion surrounding the bottom portion, and a receiving engagement arrangement, the receiving engagement arrangement configured to be coupled to the engagement arrangement of the pan, such that a cavity exists between the base and the pan; and a liquid in the cavity, the liquid contacting at least the lower surface of the bottom portion of the pan, the liquid having a freezing temperature lower than a freezing point of water.

According to yet another embodiment, a method for quickly freezing a food products may be summarized as including: cooling a pan to a temperature below the freezing point of water; and pouring a food base mix into the pan to freeze the food base mix.

BRIEF DESCRIPTION OF THE SEVERAL VIEWS OF THE DRAWING(S)

DETAILED DESCRIPTION OF THE INVENTION

The following detailed description is directed toward devices and methods for quickly freezing food products, such as ice cream, gelato, sorbet and the like. The following detailed description and corresponding figures are intended to provide an individual of ordinary skill in the art with enough information to enable that individual to make and use embodiments of the invention. Such an individual, however, having read this entire detailed description and reviewed the figures, will appreciate that modifications can be made to the illustrated and described embodiments, and/or elements removed therefrom, without deviating from the spirit of the invention. It is intended that all such modifications and deviations fall within the scope of the invention, to the extent they are within the scope of the associated claims.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIGS. 1 through 4 illustrate an example embodiment of a device 10 for freezing liquids into food products, such as ice cream, gelato, or sorbet. The device 10 primarily includes a pan 12, a base 14, and a heat sink 40.

Figure 1:
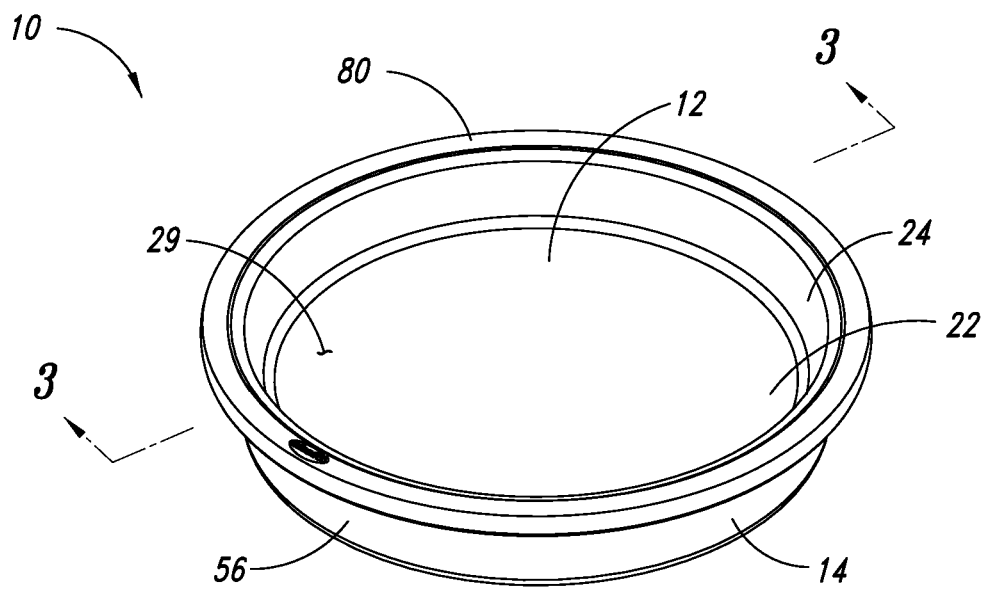
FIG. 1 is a top isometric view of a device for quickly freezing liquid food products, according to one embodiment.
Figure 3:
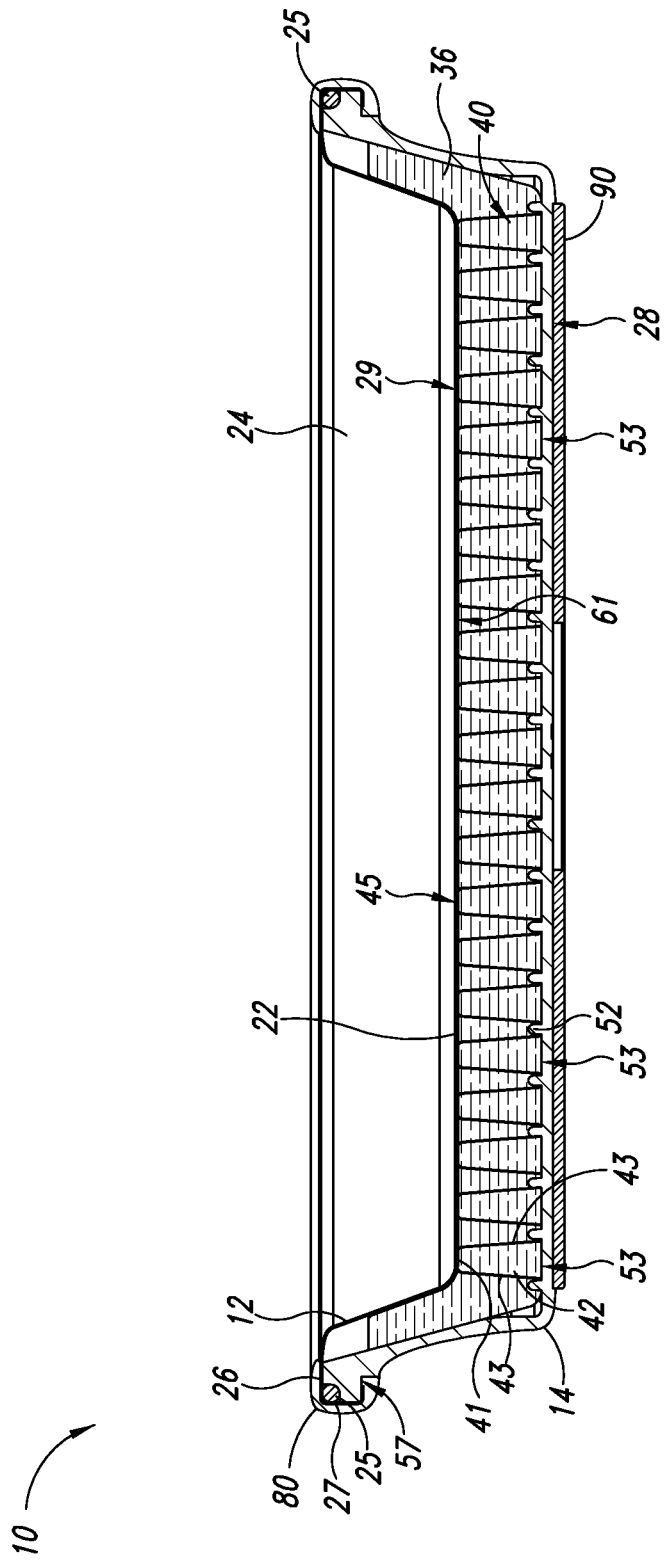
FIG. 3 is a cross-sectional view of the device of FIG. 1 taken along line 3-3 of FIG. 1.

With reference to FIGS. 1 and 3, the pan 12 in the illustrated embodiment is wide and shallow and includes a flat bottom 22, a wall 24, and a top engagement portion 26. The pan 12 can be made from plastic, metal, metal alloy, or any other material having suitable thermal properties, as explained further below, and can also be coated or otherwise treated on its external surfaces to improve ease of use or functionality. An individual of ordinary skill in the art, having reviewed this entire disclosure, will immediately appreciate that variations can be made to the pan design without deviating from the spirit of the invention.

As best seen in FIG. 3, the flat bottom 22 and the wall 24 of the pan 12 form a substantially u-shaped cross section. The engagement portion 26 extends outwardly from the wall 24 and includes an L-shaped engagement tab 27. The engagement tab 27 is configured to engage a complementary receiving surface 57 of the base 14. It is appreciated that the engagement tab 27 may be appropriately selected to be flexible, such that during assembly, the engagement tab 27 may be elastically displaced outwardly to allow the pan 12 to be nested inside the base 14 and, upon nesting, the engagement tab 27 may retract to engage the receiving surface 57 of the base 14 and secure the pan 12 inside the base 14. To provide an air/liquid tight seal between the pan 12 and the base 14, a seal device 25, such as a gasket or an O-ring, can be provided to sealingly engage the pan 12 to the base 14. Although the embodiment shown includes a hook-type engagement mechanism to secure the pan 12 to the base 14, in other embodiments, the pan 12 may be fastened to the base 14, or may include other engagement features.

Figure 2:
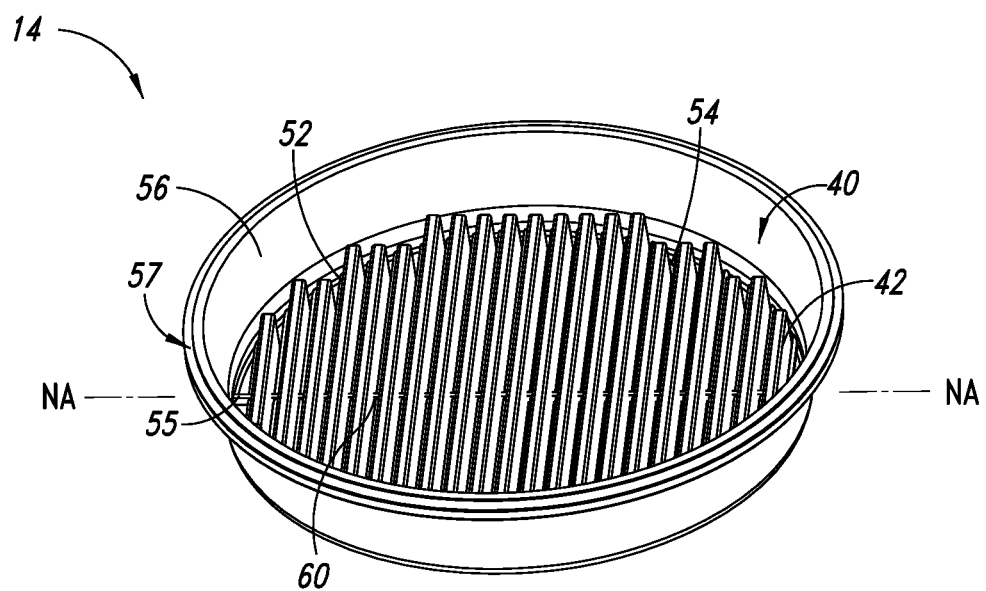
FIG. 2 is a top isometric view of a base of the device of FIG. 1, shown with a heat sink received therein.

FIG. 2 illustrates the base 14, according to one embodiment. The base 14 includes a lower surface 54, a wall 56, the receiving surface 57, and a plurality of longitudinally extending substantially U-shaped channel sections 52. The receiving surface 57 extends outwardly from the wall 56 to receive the engagement tab 27 of the pan 12. The channel sections 52 are positioned on top of the lower surface 54 inside the wall 56. Each channel section 52 is laterally spaced apart from an adjacent channel section 52, thereby forming a channel 53 to receive therein a fin 42 of a heat sink 40. The base 14 also includes a laterally extending U-shaped longitudinal channel section 55. The longitudinal channel section 55 is positioned on top of the lower surface 54 along a horizontal neutral axis NA of the base 14. The longitudinal channel section 55 includes therein an opening 60 to receive therethrough the channel sections 52. The channel sections 52, as discussed above, form a channel 53 to receive therein the fins 42 of the heat sink 40, and also provide structural rigidity to the base 14 as well as increasing the surface area to transfer heat away from the pan 12 during use, as discussed in further detail below. The number, size, shape, and orientation of the channel sections 52 can all be modified without deviating from the spirit of the invention, as one of ordinary skill in the relevant art will immediately appreciate after reviewing the entire disclosure. Further, the channel sections 52 can be formed at the same time and from the same material as the base 14, such as by molding, casting, or other suitable means, or can be attached to the base 14 by suitable means, such as by welding.

With reference to FIGS. 2 and 3, the heat sink 40 includes a plurality of fins 42 that have a substantially U-shaped cross-section, including a base flange 41 and upstanding legs 43 on opposing sides of the base flange 41. The upstanding legs 43 are positioned within the channels 53 of the base 14. The base flange 41 includes a top surface 45, which is thermally coupled to a lower surface 61 of the pan 12, such that the heat sink 40 may transfer heat away from the pan 12 during use. Although the embodiment of the heat sink 40 shown includes fins 42 that appear flared, in other embodiments, the heat sink 40 may include straight fins, pinned fins, or other suitable shape of the fins without deviating from the spirit of the invention. Each fin 42 of the heat sink 40 may be individually coupled to the base 14, or the fins 42 can be formed as an integral unit, which may be coupled to the base 14. Further, the heat sink 40 and the base 14 may also be integrally formed as one integral unit. Still further, the fins 42 can be individually or as an integral unit be coupled to the lower surface 61 of the pan 12, or be formed with the pan 12 as an integral unit. The number, size, shape, and orientation of the fins 42 can all be modified without deviating from the spirit of the invention, as one of ordinary skill in the relevant art will immediately appreciate after reviewing the entire disclosure.

With reference to FIG. 3, in the illustrated embodiment, a liquid 36 at least partially fills the space between the pan 12 and the base 14. The liquid 36 is selected for its thermal properties to facilitate the transfer of heat away from an external surface 29 of the pan 12. For instance, a suitable liquid with a freezing point below 32° Fahrenheit may be selected, such that, in use, thermal energy from the higher temperature base mix may be transferred to the lower temperature liquid 36 fluid medium. In the illustrated embodiment, the liquid 36 is a mixture of water and propylene glycol. However, one of ordinary skill in the art having reviewed this entire disclosure will immediately appreciate that other liquids may be used instead without deviating from the spirit of the invention. For example, the liquid 36 may be a gel, a urea-based freezing liquid, or another type of fluid having suitable thermal properties.

Figure 4:
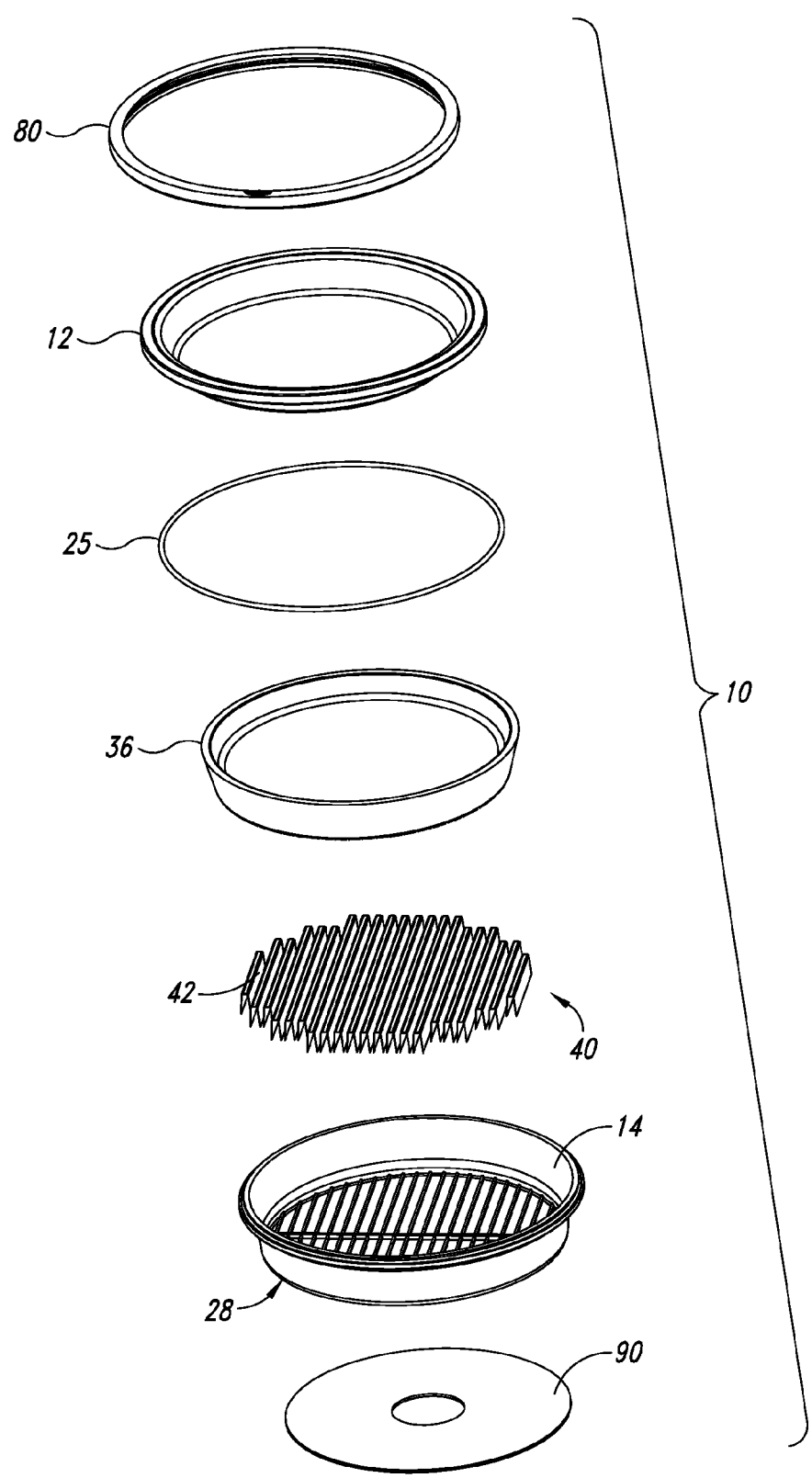
FIG. 4 is an exploded isometric view of the device of FIG. 1.

With reference to FIG. 4, the illustrated embodiment of the device 10, includes a grip 80 externally mounted to the pan 12. The grip 80 may be made of rubber or another suitable material may be selected that would aid a user in displacing the device 10 and may have suitable thermal insulation properties to facilitate displacement of the device 10 without causing burns to the user. The illustrated embodiment of the device 10 includes a foot pad 90 attached to a lower external surface 28 of the base 14. The foot pad 90 may be made from a material that facilitates absorption of moisture as the device 10 is placed on any working surface. The foot pad 90 may also have suitable frictional properties to prevent displacement of the device 10 when in use. For example, the foot pad 90 may be made from foam, PVC, or other suitable materials.

In use, the device 10 can be pre-cooled to a temperature below the freezing point of water. In some embodiments, the device 10 can be pre-cooled to a temperature of around 20-25° Fahrenheit. In other embodiments, the device 10 can be pre-heated to a higher or lower temperature. In the illustrated embodiment, the liquid 36 can have a freezing temperature below 20° Fahrenheit; accordingly, the liquid is still in its liquid phase at this point.

After the device 10 is pre-cooled, the user can pour any base mix of the food that is to be frozen into the pan 12. For ice cream, for example, the user can pour a desired cream-based base mix into the pan 12. The food to be frozen settles onto the external surface 29 of the pan 12, which is at or near the pre-cooled temperature. In the illustrated embodiment, the pan 12 is wide and flat, causing the food product to spread out, increasing the surface area of the food product in contact with the external surface 29 of the pan, which also increases the rate of heat exchange.

The external surface 29 of the pan 12 transfers heat away from the food. As the external surface 29 of the pan 12 is warmed up by the food, the heat is transferred into the extended surfaces of the fins 42 and, as the fins 42 warm up, from the fins 42 into the adjoining liquid 36. Because the liquid 36 is below the freezing point of water, the food continues to cool until it freezes, the heat being transferred out of the food even as it reaches freezing temperatures.

The liquid 36 can be selected to maintain its temperature for as long as possible, allowing the user to continue freezing food. In alternate embodiments, the device 10 could be plugged in or use other forms of energy to cool the liquid 36 or the external surface 29 of the pan 12 directly.

Figure 5:
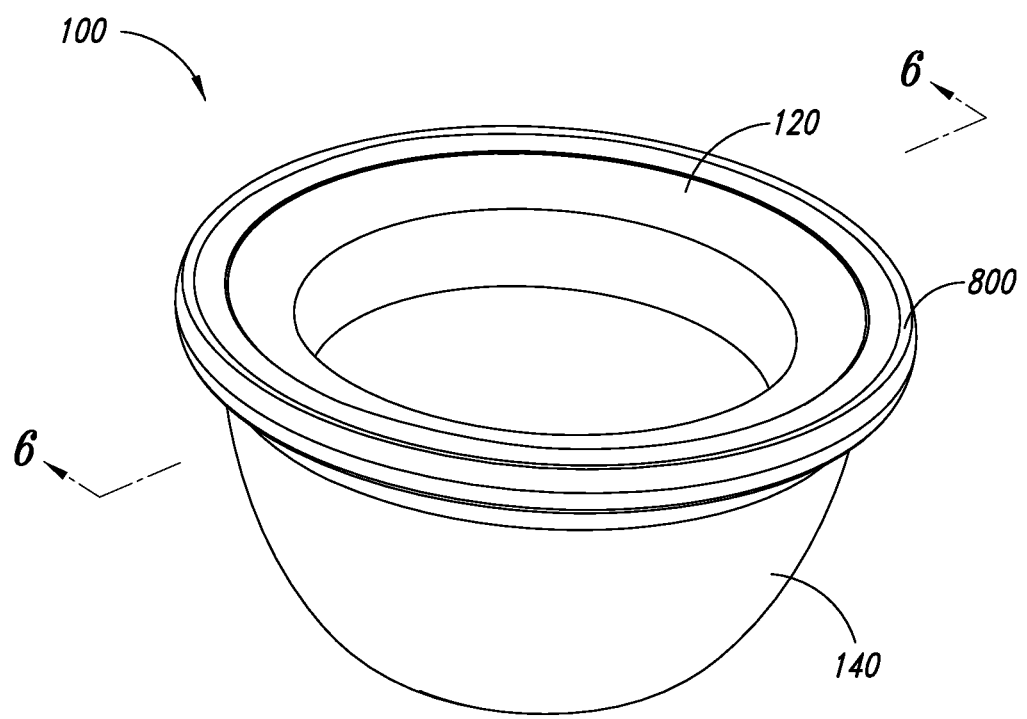
FIG. 5 is a top isometric view of a device for quickly freezing liquid food products, according to another embodiment.
Figure 6:
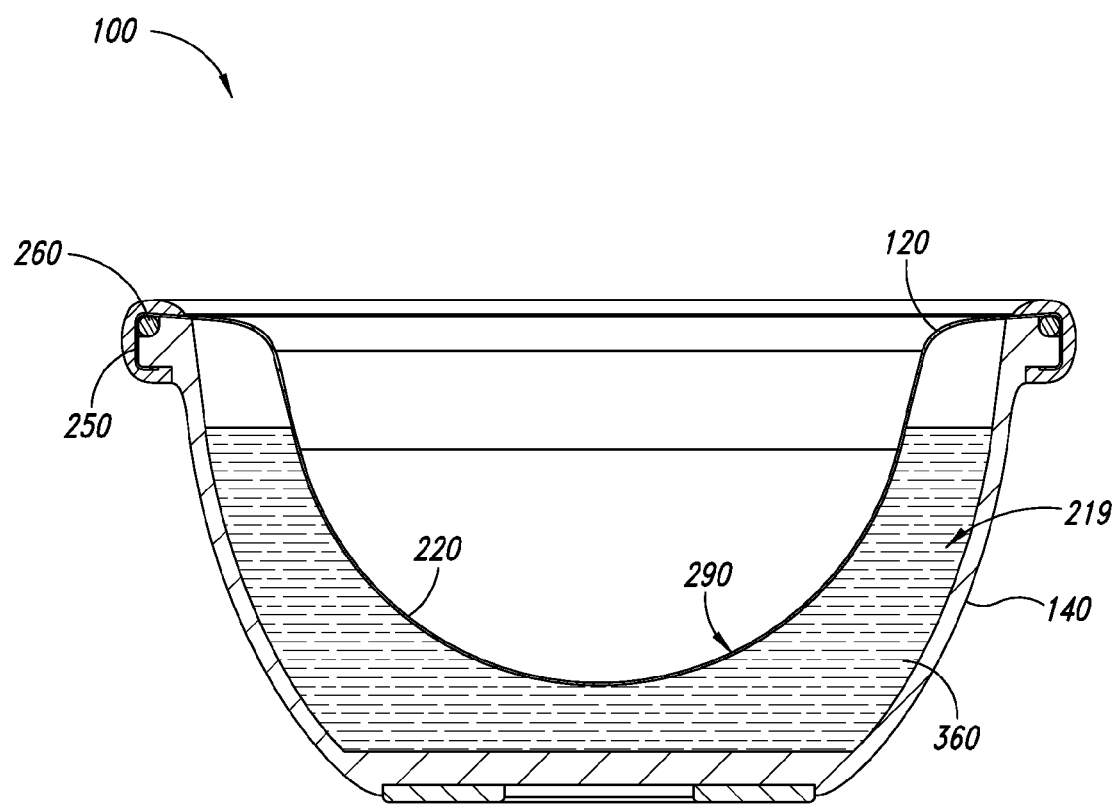
FIG. 6 is a cross-sectional view of the device of FIG. 5 taken along line 6-6 of FIG. 5.
Figure 7:
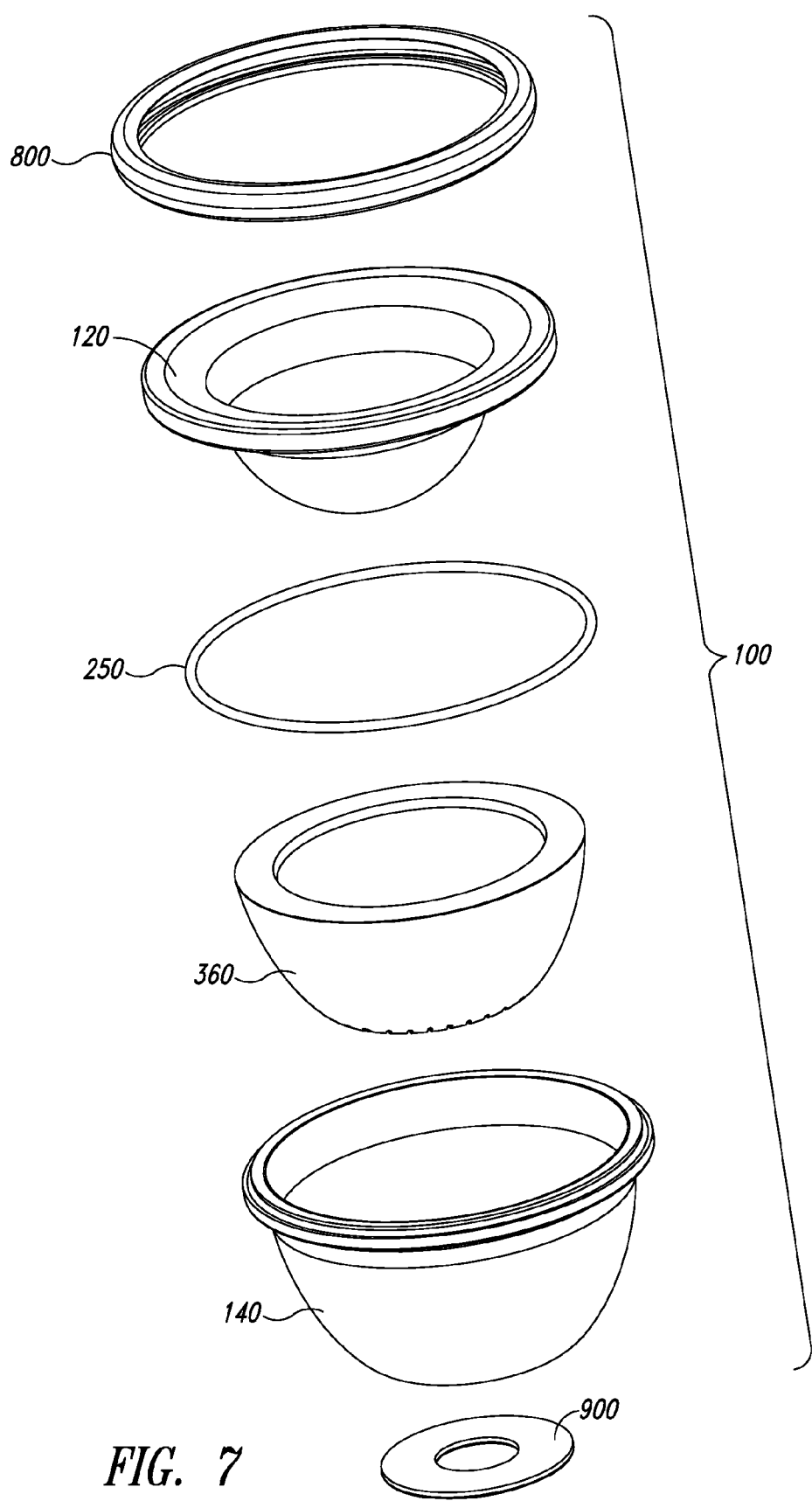
FIG. 7 is an exploded isometric view of the device of FIG. 5.
Figure 8:
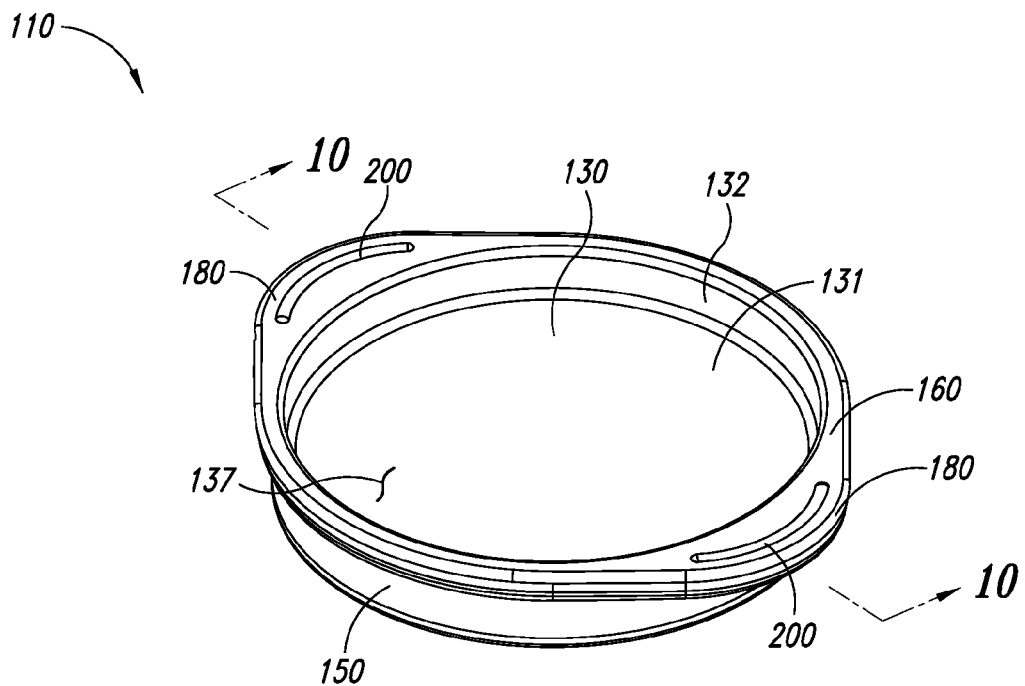
FIG. 8 is a top isometric view of a device for quickly freezing liquid products, according to yet another embodiment.

FIGS. 5 through 7 illustrate an alternate embodiment of a device 100 for freezing liquids into food products, such as ice cream, gelato, or sorbet. The device 100 primarily includes a base 140 and a pan 120. The pan 120 includes an engagement portion 260 to engage the base 140, thereby securing the pan 120 to the base 140. To provide an air/liquid tight seal between the pan 120 and the base 140, a seal device 250, such as a gasket or an O-ring, can be provided to sealingly engage the pan 120 to the base 140. The device 100 includes a grip 800 externally mounted to the pan 120 and a foot pad 900 externally attached to the base 140.

With continued reference to FIGS. 5 through 7, the pan 120 is shallow, having a curved bottom 220. As shown best in FIG. 6, the shallow depth of the pan 120 relative to the depth of the base 140 creates a space 219 therebetween. The space 219 is partially filled with a liquid 360 having suitable thermal properties to transfer heat away from an external surface 290 of the pan 120. More particularly, the device 100 may be suitably sized to facilitate individual servings. For example, the device 100 may be a mini ice cream maker, whereby an ice cream base mix may be poured onto the pan 120 to quickly freeze into ice cream. Upon freezing, the device 100 may be readily served to a user.

FIGS. 8 through 11 illustrate a yet another alternate embodiment of a device 110 for freezing liquids into food products, such as ice cream, gelato, or sorbet. The device 110 primarily includes a pan 130 and a base 150. The pan 130 is fastened to the base 150 via fasteners 136. The illustrated device 110 also incorporates a rim 160 having two opposing handles 180. The rim 160 in the illustrated embodiment finishes assembly of the device 110 and seals the pan 130 to the base 150. The illustrated handles 180 have grips 200 to facilitate holding the device 110. Although in the illustrated embodiment, the handles 180 are associated with the rim 160, in other embodiments, the handles 180 may be associated with the pan 130 or the base 150, making the rim 160 unnecessary.

Figure 9:
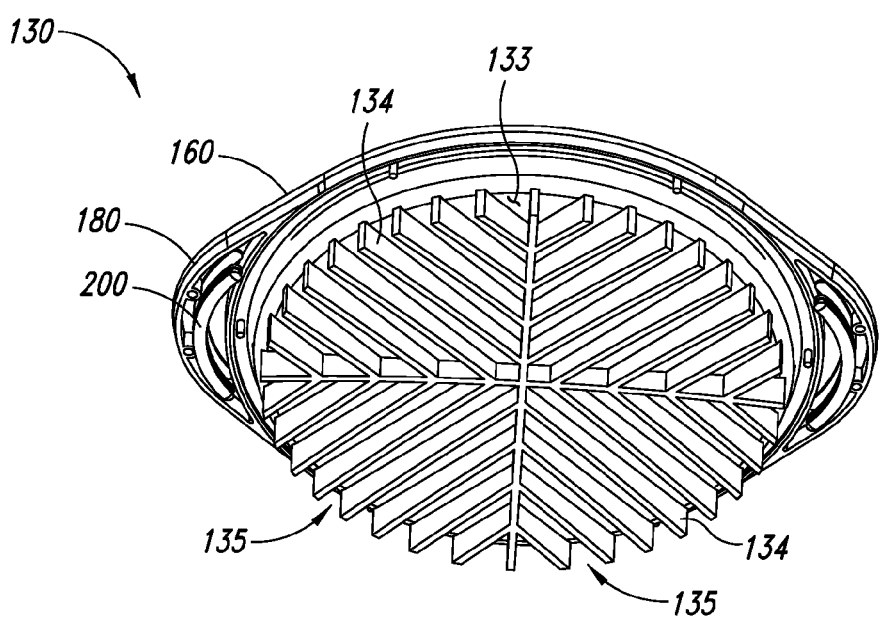
FIG. 9 is a bottom isometric view of a base from the device of FIG. 8.

With continued reference to FIGS. 8 through 11, the pan 130 in the illustrated embodiment is wide and shallow, having a flat bottom 131 and a wall 132. As best shown in FIG. 9, with the base 130 removed, a lower, exterior surface 133 of the pan 130 is configured with an array of fins 134 projecting outwardly, away from the lower, exterior surface 133. Each fin 134 is spaced apart from each adjacent fin by a channel 135 that extends along a portion of the lower, exterior surface 133.

Figure 10:
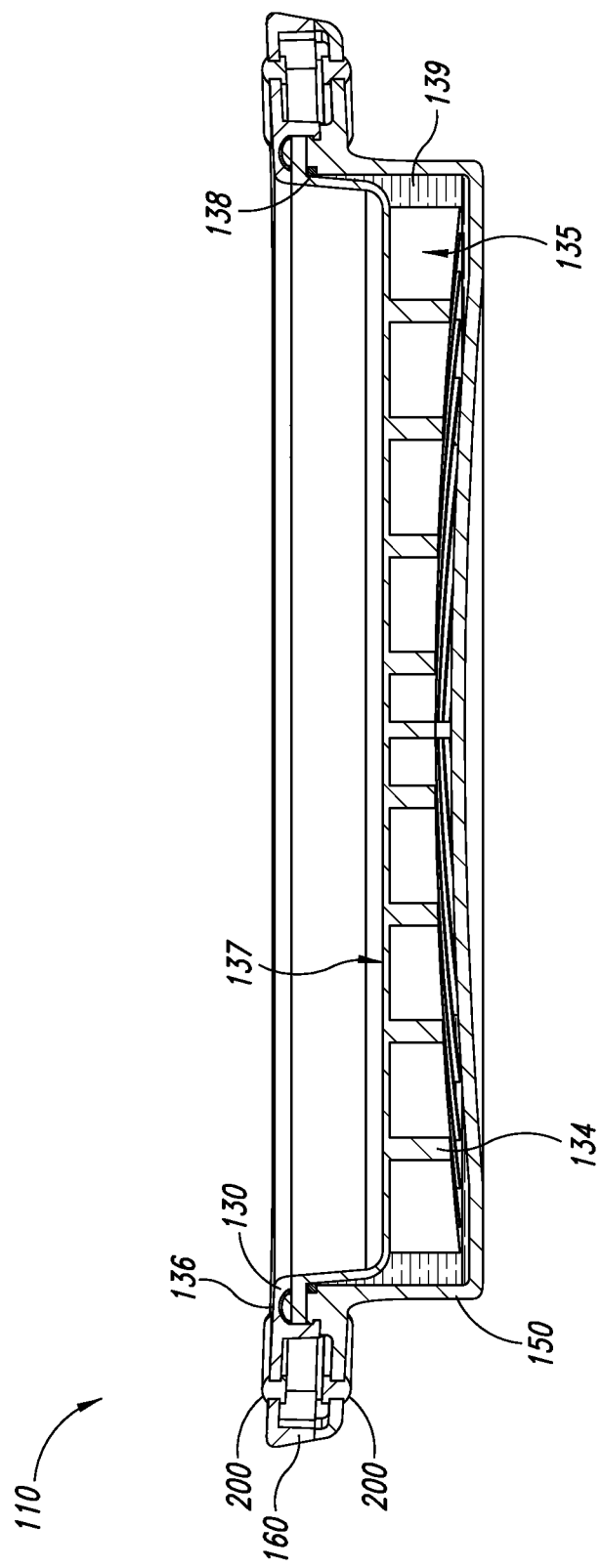
FIG. 10 is a cross-sectional view of the device of FIG. 8 taken along line 10-10 of FIG. 8.
Figure 11:
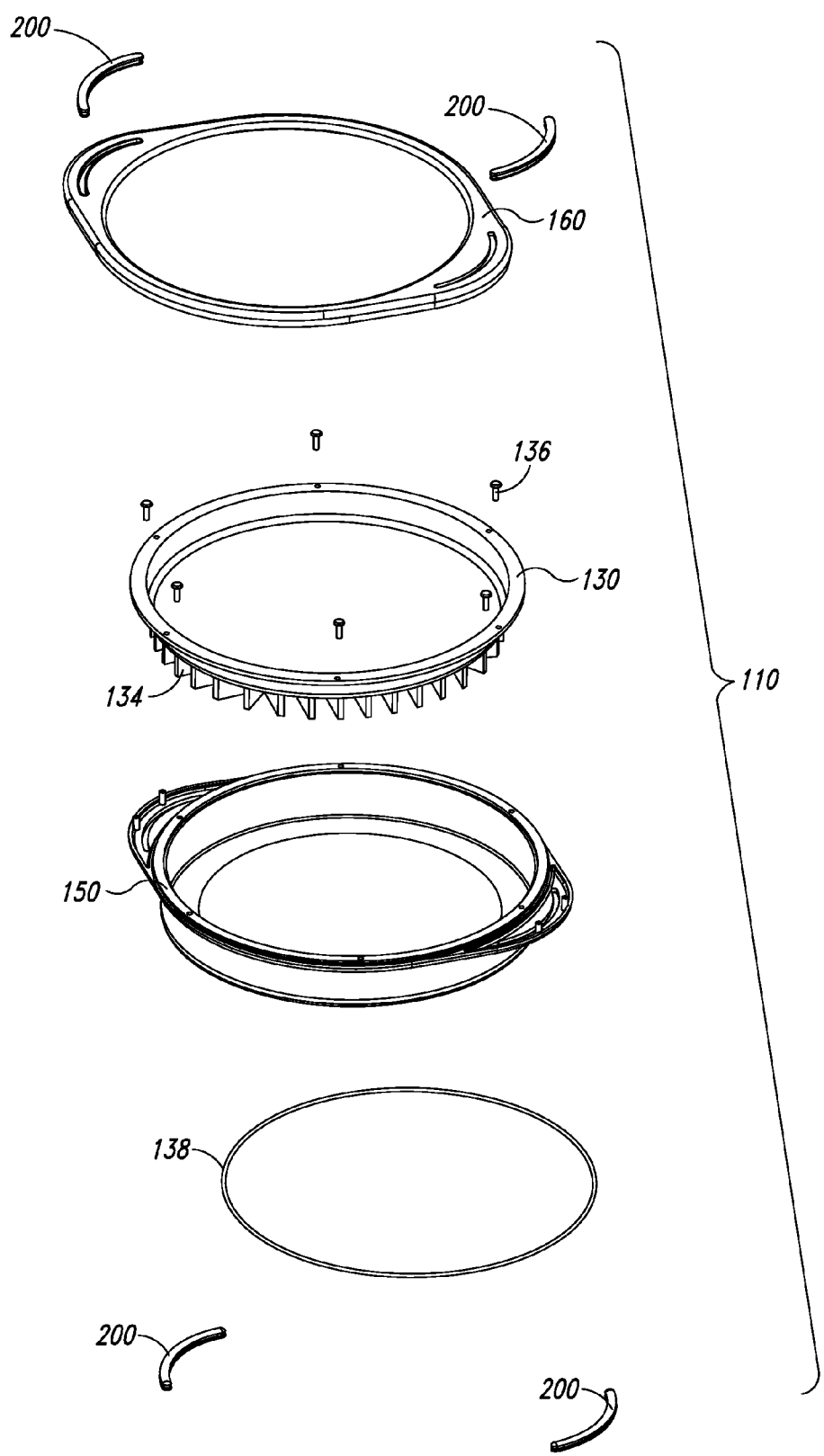
FIG. 11 is an exploded isometric view of the device of FIG. 8.

With reference to FIG. 10, the pan 12 has an upper, working surface 137, and the pan 130 is nested inside the base 150. A seal device 138 can assist in creating an air/liquid tight seal between the pan 130 and the base 150. The fins 134 are positioned inside the base 150. A liquid 139 at least partially fills the space between the pan 130 and the base 150. As discussed elsewhere, the liquid 139 is selected for its thermal properties, to facilitate the transfer of heat away from the upper, working surface 137 of the pan 130.

Although in the illustrated alternate embodiment, device 110, the lower exterior surface 133 of the pan 130 includes fins 134, in other embodiments, a corrugated or baffled surface may be used instead, which would similarly increase the surface area in contact with the liquid 139. An individual of ordinary skill in the art, having reviewed this entire disclosure, will immediately appreciate that these and other variations and modifications could be made to the pan 130, the base 150, the fins 134 or other features without deviating from the spirit of the invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Application No. 61/615,769, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for quickly freezing a food product, the device comprising: a pan adapted to receive the food product to be frozen, the pan having a bottom portion and a wall portion surrounding the bottom portion, the bottom portion having an upper surface and an opposing lower surface; a base positioned under the pan, the base having a bottom portion and a wall portion, the wall portion of the base being coupled to the wall portion of the pan, the bottom portion of the base having an interior surface, a cavity which receives a fluid medium is defined by the interior surface of the bottom portion of the base and the lower surface of the bottom portion of the pan, the bottom portion including a plurality of channel sections spaced apart to define a respective channel; and a heat sink positioned within the cavity to assist in freezing the food product, the heat sink thermally coupled to the pan to assist in freezing the food product and including a plurality of fins thermally coupled to the interior surface of the bottom portion of the base, the fins received in the respective channel of the bottom portion of the base.

2. The device of claim 1, wherein the heat sink comprises the plurality of fins to draw heat away from the food product and dissipate the heat into a surrounding fluid.

3. The device of claim 2, further comprising:
a liquid in the cavity, the liquid contacting at least one of the fins of the heat sink, the liquid having a freezing temperature lower than a freezing point of water.

4. The device of claim 1, wherein the bottom portion of the pan is at least substantially flat.

5. The device of claim 1, wherein the bottom portion of the pan intersects the wall portion of the pan at an angle.

6. The device of claim 1, wherein the base is sealingly coupled to the pan.

7. The device of claim 1, wherein the cavity is located below the bottom portion of the pan.

8. The device of claim 1, wherein the cavity is located below and laterally outside the bottom portion of the pan.

9. The device of claim 1, wherein the fins are bonded to the pan.

10. The device of claim 1, wherein the fins are part of the pan.

11. The device of claim 1, wherein the liquid in the cavity only partially fills the cavity.

12. A method of freezing food products, comprising:
providing a device of claim 1;
cooling the pan to a temperature below the freezing point of water; and
pouring a food base mix into the pan to freeze the food base mix.

13. The method of claim 12, wherein cooling of the pan includes providing the heat sink to draw heat away from the food base mix.

14. A device for quickly freezing a food product, the device comprising: a pan adapted to receive the food product to be frozen, the pan including: a bottom portion, the bottom portion having an upper surface and an opposing lower surface, a wall portion surrounding the bottom portion, and an engagement arrangement; a base positioned under the pan, the base including a bottom portion having an interior surface, the bottom portion including a plurality of channel sections spaced apart to define a respective channel, a wall portion surrounding the bottom portion, the wall portion of the base being coupled to the wall portion of the pan, and a receiving engagement arrangement, the receiving engagement arrangement configured to be coupled to the engagement arrangement of the pan, such that a cavity exists between the base and the pan, the cavity being defined by the interior surface of the bottom portion of the base and the lower surface of the bottom portion of the pan; a heat sink positioned within the cavity to assist in freezing the food product, the heat sink thermally coupled to the pan to assist in freezing the food product and including a plurality of fins thermally coupled to the interior surface of the bottom portion of the base, the fins received in the respective channel of the bottom portion of the base; and a liquid in the cavity, the liquid contacting at least the lower surface of the bottom portion of the pan, the liquid having a freezing temperature lower than a freezing point of water.

15. The device of claim 14, wherein the wall portion of the pan includes an external surface and an internal surface, the external surface being in contact with the liquid to assist in freezing the food product.

16. The device of claim 14, wherein the liquid is a urea-based freezing liquid.

17. The device of claim 14, wherein the liquid is a mixture of water and propylene glycol.

18. The device of claim 14, wherein the engagement arrangement of the pan projects outwardly from the wall portion of the pan and the receiving engagement arrangement of the base projects outwardly from the wall portion of the base, such that the engagement arrangement of the pan engages the receiving engagement of the base to secure the pan to the base.

19. A device for quickly freezing a food product, the device comprising:
a pan adapted to receive the food product to be frozen, the pan including:
a bottom portion, the bottom portion having an upper surface and an opposing lower surface,
a wall portion surrounding the bottom portion, and
an engagement arrangement;
a base positioned under the pan, the base including:
a bottom portion, the bottom portion of the base including a plurality of channel sections spaced substantially uniformly apart from each other to define a respective channel,
a wall portion surrounding the bottom portion, and
a receiving engagement arrangement, the receiving engagement arrangement configured to be coupled to the engagement arrangement of the pan, such that a cavity exists between the base and the pan;
a heat sink positioned within the cavity, the heat sink thermally coupled to the pan to assist in freezing the food product and including a plurality of fins thermally coupled to an upper surface of the bottom portion of the base, the fins received in the respective channel of the bottom portion of the base; and
a liquid in the cavity, the liquid contacting at least the lower surface of the bottom portion of the pan, the liquid having a freezing temperature lower than a freezing point of water, wherein the fins are configured in a substantially u-shaped cross-section having a base flange and upstanding legs on opposing sides of the base flange, each upstanding leg being thermally coupled to a respective channel section and the base flange being thermally coupled to the bottom portion of the pan.

* * * * *